US007467145B1

(12) United States Patent
Castellanos et al.

(10) Patent No.: US 7,467,145 B1
(45) Date of Patent: Dec. 16, 2008

(54) SYSTEM AND METHOD FOR ANALYZING PROCESSES

(75) Inventors: Maria Guadalupe Castellanos, Sunnyvale, CA (US); Fabio Casati, Palo Alto, CA (US); Ming-Chien Shan, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 471 days.

(21) Appl. No.: 11/107,285

(22) Filed: Apr. 15, 2005

(51) Int. Cl.
*G06F 17/30* (2006.01)
(52) U.S. Cl. .................................. 707/10; 707/103 R
(58) Field of Classification Search ............... 707/1–10, 707/100–103 Z, 200–206, 103 X, 103 Y, 707/104.1; 709/239, 240, 216, 217, 218, 709/238; 705/7
See application file for complete search history.

(56) References Cited

U.S. PATENT DOCUMENTS

| | | | |
|---|---|---|---|
| 5,276,870 A | 1/1994 | Shan et al. | |
| 5,325,525 A | 6/1994 | Shan et al. | |
| 5,412,806 A | 5/1995 | Du et al. | |
| 5,546,571 A | 8/1996 | Shan et al. | |
| 5,694,591 A | 12/1997 | Du et al. | |
| 5,826,239 A | 10/1998 | Du et al. | |
| 5,870,545 A | 2/1999 | Davis et al. | |
| 5,937,388 A | 8/1999 | Davis et al. | |
| 6,014,673 A | 1/2000 | Davis et al. | |
| 6,041,306 A | 3/2000 | Du et al. | |
| 6,078,982 A | 6/2000 | Du et al. | |
| 6,308,163 B1 | 10/2001 | Du et al. | |
| 7,302,609 B2 * | 11/2007 | Matena et al. | ................. 714/15 |
| 2002/0161777 A1 * | 10/2002 | Smialek | ..................... 707/102 |
| 2002/0161823 A1 | 10/2002 | Casati et al. | |
| 2002/0170035 A1 | 11/2002 | Casati et al. | |
| 2002/0174093 A1 | 11/2002 | Casati et al. | |
| 2002/0194257 A1 | 12/2002 | Casati et al. | |
| 2003/0023450 A1 | 1/2003 | Casati et al. | |
| 2003/0028389 A1 | 2/2003 | Casati et al. | |
| 2003/0083910 A1 | 5/2003 | Sayal et al. | |
| 2003/0084142 A1 | 5/2003 | Casati et al. | |
| 2003/0120530 A1 | 6/2003 | Casati et al. | |
| 2003/0126139 A1 * | 7/2003 | Lee et al. | ..................... 707/100 |
| 2003/0144860 A1 | 7/2003 | Casati et al. | |
| 2003/0149604 A1 | 8/2003 | Casati et al. | |
| 2003/0149714 A1 | 8/2003 | Casati et al. | |
| 2003/0153994 A1 | 8/2003 | Jin et al. | |
| 2003/0154154 A1 | 8/2003 | Sayal et al. | |
| 2003/0191679 A1 | 10/2003 | Casati et al. | |
| 2003/0212569 A1 | 11/2003 | Casati et al. | |
| 2003/0225604 A1 | 12/2003 | Casati et al. | |

(Continued)

OTHER PUBLICATIONS

Suman Nath et al., "Subtleties in Tolerating Correlated Failures in Wide-are Storage Systems", May 5, 2006, www.comp.nus.edu.sg, pp. 1-18.*

*Primary Examiner*—Diane Mizrahi

(57) ABSTRACT

Embodiments of the present invention relate to a system and method for analyzing processes. Specifically, embodiments of the present invention relate to identifying a node of a process that is potentially affected by an affected resource using information relating to a link between the node and the affected resource, the process having a related process instance that has an execution stage, and applying an interval prediction model corresponding to the execution stage of the process instance and the node, the interval prediction model determining a probability that the process instance will reach the node before a designated occurrence.

30 Claims, 4 Drawing Sheets

U.S. PATENT DOCUMENTS

| | | |
|---|---|---|
| 2003/0225644 A1 | 12/2003 | Casati et al. |
| 2003/0233273 A1 | 12/2003 | Jin et al. |
| 2003/0236677 A1 | 12/2003 | Casati et al. |
| 2003/0236689 A1 | 12/2003 | Casati et al. |
| 2003/0236691 A1 | 12/2003 | Casati et al. |
| 2004/0015378 A1 | 1/2004 | Casati et al. |
| 2004/0044636 A1 | 3/2004 | Casati et al. |
| 2004/0103076 A1 | 5/2004 | Casati et al. |
| 2004/0103186 A1 | 5/2004 | Casati et al. |
| 2004/0153329 A1 | 8/2004 | Casati et al. |
| 2004/0199517 A1 | 10/2004 | Casati et al. |
| 2005/0131913 A1* | 6/2005 | Barsness et al. ............. 707/100 |
| 2005/0187940 A1* | 8/2005 | Lora et al. .................... 707/10 |
| 2005/0192989 A1* | 9/2005 | Adiba et al. ................. 707/101 |
| 2006/0101152 A1* | 5/2006 | Yeh et al. .................... 709/231 |
| 2006/0171410 A1* | 8/2006 | Jung et al. .................. 370/447 |

* cited by examiner

SYSTEM AND METHOD FOR ANALYZING PROCESSES

BACKGROUND

This section is intended to introduce the reader to various aspects of art, which are related to various aspects of the present invention that are described or claimed below. This discussion is believed to be helpful in providing the reader with background information to facilitate a better understanding of the various aspects of the present invention. Accordingly, it should be understood that these statements are to be read in this light and not as admissions of prior art.

Business operations monitoring and management (BOMM) includes monitoring of business activities and automation of tasks relating to business processes. When properly implemented, BOMM results in improved business management, which often leads to a competitive advantage. For example, if a manufacturing company effectively utilizes a technique for BOMM, it can produce higher quality products at a lower cost than its competitors. Accordingly, the area of BOMM is rapidly gaining importance both in industry and in academia.

Entities interested in BOMM often utilize performance reporting tools to assist in achieving operational improvements. Such tools often provide visibility into business processes and facilitate business analysis. For example, existing performance reporting tools are adapted to provide users with information relating to the achievement of business goals. However, existing reporting tools are unable to identify and therefore unable to report impacts on business operations resulting from resource malfunctions. Consequently, existing reporting tools are unable to report impacts from resource malfunctions on business goals.

DETAILED DESCRIPTION OF SPECIFIC EMBODIMENTS

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which often vary from one implementation to another. Moreover, it should be appreciated that such a development effort can be complex and time consuming, but would be a routine undertaking of design, fabrication, and manufacture for those of ordinary skill having the benefit of this disclosure.

Figure 1:
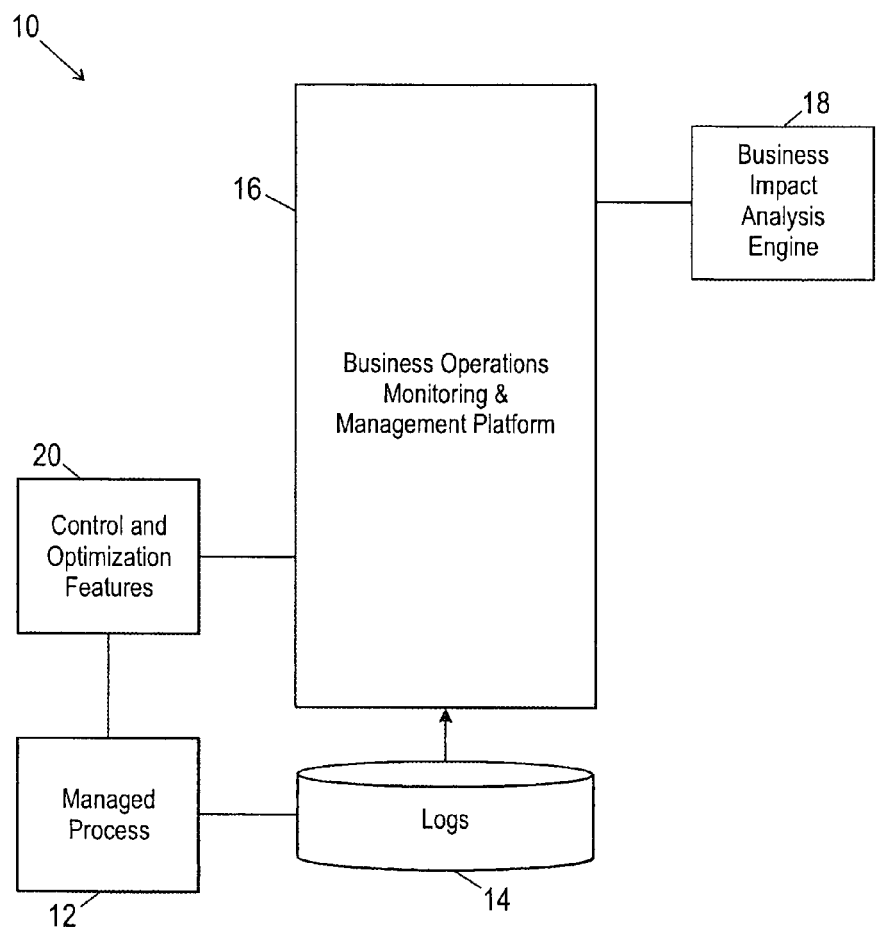
FIG. 1 is a block diagram of a system for monitoring and management of business operations illustrating one embodiment of the present invention.

FIG. 1 is a block diagram of a system for monitoring and management of business operations illustrating one embodiment of the present invention. The illustrated system is generally referred to by reference number 10. The system 10 incorporates various modules, applications, and processes. For example, in one embodiment, the system 10 leverages system and network monitoring applications, data warehouse, and Online Analytic Processing (OLAP) applications to analyze business operations. Specifically, the illustrated embodiment of system 10 includes: a managed process 12, a data logging component 14, a BOMM platform 16, and a business impact analysis engine (BIAE) 18. While FIG. 1 separately delineates specific components, in other embodiments the individual components are split into multiple components. In still other embodiments the illustrated components are combined into a single component. Further, individual components in accordance with embodiments of the present invention comprise hardware, software, or some combination thereof.

The illustrated embodiment of system 10 begins with communication between the managed process 12 and the logging component 14. The managed process 12 in the illustrated embodiment represents a process that is adapted for monitoring and management. For example, in one embodiment of the present invention, the managed process 12 includes a business IT infrastructure, related applications, and business processes. Portions of the managed process 12 are monitored and logged by the logging component 14, which cooperates with the BOMM platform 16 to facilitate monitoring and management of the managed process 12. In some embodiments of the present invention, this cooperation occurs in real-time (i.e., within a short and predictable time frame). It should be noted that while the illustrated embodiment of system 10 operates in the illustrated order, in other embodiments, certain aspects of the process are performed in a different order.

The BOMM platform 16 provides information and alerts relating to the managed process 12. In one embodiment of the present invention the BOMM platform 16 includes control and optimization features 20 that facilitate automatic or manual intervention on the managed process 12. The optimization features 20 enable a manager to make changes to resources (e.g., computers utilized in a manufacturing operation) and processes in response to issues that arise during operation. Additionally, the optimization features 20 facilitate optimization of business-relevant metrics by facilitating identification of areas for improvement. For example, one embodiment of the present invention simulates several alternative process configurations to provide predictions that maximize or minimize a user designated business metric. These predictions are then used to recommend a configuration within defined constraints. In one embodiment of the present invention, the BOMM platform 16 is a business operation management platform.

In accordance with embodiments of the present invention, a useful type of prediction involves an impact estimation of IT resource failures and performance degradations on business goals. The BIAE 18, which is illustrated as a component of the BOMM platform 16 in system 10, facilitates such predictions. Indeed, the BIAE 18 facilitates analysis of impacts caused by failures or performance degradations in a managed process (e.g., IT resources) on business goals, which are typically expressed as metrics over business processes. For example, when a system or application performance is degraded, embodiments of the present invention facilitate identification of which abstract processes will be affected and how the abstract processes will be affected. Additionally, embodiments of the present invention utilize intelligent techniques (e.g., data mining techniques) to predict active process instances (e.g., processing an order for services) having a high probability of eventually being impacted by a failure in a system.

Figure 2:
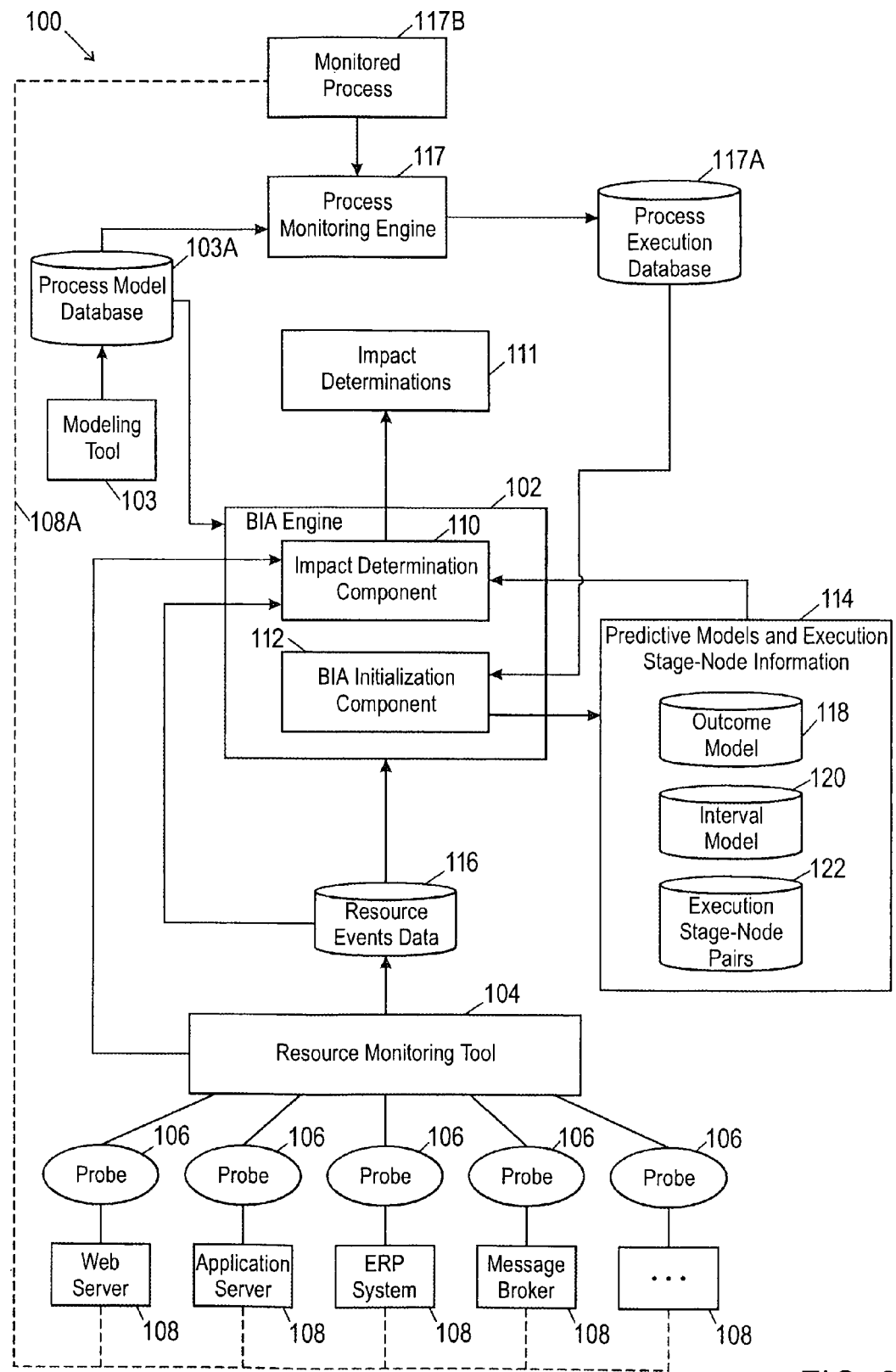
FIG. 2 is a block diagram of exemplary system architecture for business impact analysis illustrating one embodiment of the present invention.

FIG. 2 is a block diagram of exemplary system architecture for business impact analysis illustrating one embodiment of the present invention. The system architecture is generally referred to by reference number 100. In one embodiment, the architecture 100 facilitates utilization of data mining techniques to determine which active instances (i.e., currently executing process instances) will be impacted by a failure or degradation in a related aspect of a business process, such as a resource of an IT infrastructure. In other words, the architecture 100 operates to facilitate business impact analysis as it relates to certain aspects of the business process.

In the illustrated embodiment, the architecture 100 includes a BIA Engine 102, a modeling tool 103, a resource monitoring tool 104, and a process model database 103A. To properly identify the business impact of certain failures and degradations in a process, the process is first modeled using the modeling tool 103. The modeling tool 103 allows a user to define the model and also allows for specification of mappings (i.e., linkages) of IT and human resources to different nodes (i.e., activities) of process flow. For example, in one embodiment of the present invention, the modeling tool 103 is utilized to link a process step (e.g., "verify price of item") with a particular server (e.g., database server A).

The process model database 103A stores process models in accordance with embodiments of the present invention. In one embodiment, the process model database 103A stores the model defined with modeling tool 103. Accordingly, the modeling tool 103 and the process model database 103A are communicatively coupled. Further, the BIA engine 102 is communicatively coupled to the process model database 103A to provide access to the model and allow acquisition of related information. For example, in one embodiment of the present invention, the BIA engine 102 accesses information in the process model database 103A relating to critical forward paths (i.e., paths that a process instance can follow from a given node), which will be discussed in further detail below.

Once node-resource mappings have been established, the resource monitoring tool 104 is utilized to install probes 106 that monitor the status of process related resources 108 (e.g., a web server, an application server, an ERP system, and a message broker). Line 108A represents linkages or mappings of process steps to information technology resources. Typically, embodiments of the present invention utilize prebuilt probes for components (e.g., database servers) that require monitoring. Monitoring products known to those of ordinary skill in the art include prebuilt probes for an ORACLE database server and an SAP system. However, embodiments of the present invention also utilize aspects of the monitoring tool 104 to build new probes for products that do not have preexisting probes.

Probes 106 are installed and configured to detect events (e.g., failure of a resource to pass the appropriate messages to the resource monitoring tool 104) taking place at the resources 108. The probes 106 facilitate business impact analysis by providing status indications for resources relating to the system being monitored or managed. For example, in one embodiment of the present invention, a probe 106 retrieves information relating to a change in the status of a resource (e.g., a critical status indicating malfunctions or degradations in the performance of a resource) and reports the change to the resource monitoring tool 104. The resource monitoring tool 104 then passes the information to an impact determination component 110 of the BIA engine 102. Impact determination component 110 is then utilized to identify which nodes and consequently which process executions will likely be affected by the change in status.

The impact determination component 110 makes a prediction by utilizing the resource monitoring engine's output and the information on established linkages (i.e., mappings) between process steps (i.e., nodes) and resources stored in the process model database 103A. It also utilizes classification and prediction models created by a business impact analysis initialization component (BIA initialization component) 112 that implements an initialization procedure to determine and designate prediction models, as shown in block 114, to incorporate. Next, the BIA initialization component 112 learns the designated models 114 off-line using historical execution data 117A. These models are then applied on-line by the impact determination component 110 when an event affecting the performance of one of the resources 108 takes place. Output from the impact determination component 110 includes impact determinations 111. It should be noted that in some embodiments of the present invention, the impact determination component 110 is in direct communication with the resource monitoring tool 104 to facilitate real-time or near real-time operation.

A process monitoring engine 117 provides information relating to the progress status of process instances (i.e., instances of a manufacturing process). For example, in one embodiment of the present invention, the process monitoring engine 117 monitors and logs process execution data. In the illustrated embodiment, the process monitoring engine 117 is communicatively coupled to the process model database 103A, a process execution database 117A, and a monitored process 117B. The process execution database 117A is communicatively coupled to the BIA engine 102 and provides the BIA engine 102 with access to information relating to progress status of process instances.

In one example in accordance with an embodiment of the present invention relating to a purchase order process, links established between particular resources (e.g., database server B) and particular nodes (e.g., "verify supplies in stock") of the purchase order process along with the information acquired by the process monitoring engine 117 related to progress status of each process instance (i.e., order being processed) allow the BIA engine 102 to do an impact analysis of a resource failure or degradation at the process instance level to indicate which active instances are or will likely be affected. Instances currently affected by a failure or degradation include those wherein the node being executed is supported by the resource or resources that failed or degraded. These currently affected instances are referred to as blocked instances. Instances that potentially will be affected by a current resource failure or degradation are referred to as at-risk instances. These future affected instances include those that will eventually arrive to or utilize a node supported by the failed or degraded resource before the issues relating to the failure or degradation of the resource are resolved.

Blocked instances are directly related to the failed or degraded resources and thus are determined directly. In one embodiment at-risk instances are determined using a forward path approach. The forward path approach to determining at-risk instances includes identifying instances that have a forward path (i.e., a path that a process instance can follow from a given node) between an active node and a node linked to a failed or degraded resource. The forward path approach reports instances that will potentially execute affected nodes as at-risk instances.

When using the forward path approach, measures to counteract the impact on at-risk instances are typically taken for all or some of the reported at-risk instances. For example, resources are often taken from processes that appear to be less critical, expensive resources are often allocated to assist with at risk instances, processes are routed to different paths, or customers are contacted and given notice of issues in processing their requests. A number of instances that are scheduled to potentially pass through an affected node will actually follow other paths, thus avoiding the affected node. Further, a number of instances that are scheduled to pass through an affected node will actually reach the node after the resource has recovered from the failure or degradation.

Embodiments of the present invention utilize a technique based on data mining to determine which process instances currently executing (i.e., active instances) will likely be impacted by a failure or degradation in a resource of a system such as an IT infrastructure. In one embodiment of the present invention, the technique incorporates the forward path approach. Specifically, the technique is used to learn prediction models relating to execution stages. An execution stage is given by the path that an instance has followed up to the execution of a given node n. If the node n at the end of the path is currently executing, it is a current execution stage. Each different path that has been followed to get to each node in the process by at least one process instance corresponds to a different process execution stage. Accordingly, for each such path there exists a process execution stage.

For each pair (i.e., path and corresponding process execution stage) given by a possible process execution stage S and a node N in a forward alternative path (i.e., a path that a process instance can alternatively follow from a given node, in this case, from node N), the BIA initialization component 112 automatically creates two models: an outcome prediction model 118 and an interval prediction model 120. These predictive models are also associated with a repository for execution stage-node pairs 122, as shown in block 114. The outcome prediction model 118 predicts whether the node N will be executed by a given process instance with current execution stage S. The interval prediction model 120 predicts whether the time interval to get to node N is lower than some statistical measure (e.g., the average time) of the time that the resource linked to that node takes to recover from a failure. Both of these prediction models address what is referred to as a classification issue, where the classes are "will execute (node N)" or "will not execute (node N)" for prediction model 118, and "will arrive (at node N) before (threshold) T" or "will not arrive (at node N) before (threshold) T" for prediction model 120. However, in another embodiment the interval prediction model 120 also predicts the time to get to node N, which is referred to as a regression issue or as a time series forecasting issue, depending on the technique used to learn the prediction model. The technique used to learn the prediction model is determined by the data utilized to learn the model.

When a resource failure occurs, first the mappings are retrieved to identify a set of affected nodes AN. Using this information, the forward path method is applied to identify the set I of all potentially affected active process instances. For each process instance i in the set I, and each node an in the set AN, the corresponding outcome prediction model is applied to make a prediction about whether the instance will execute the affected node an. It should be noted that, given the current execution stage s of i and the affected node n, prediction models exist if n is in a forward alternative path from the end node of s. If the prediction is positive with high confidence (i.e., it is probable that the instance will follow the path that leads to that node), the corresponding interval prediction model is applied to predict when it will reach that node. If a classification model (e.g., regression or time series forecasting) is used as the interval prediction model, then the prediction will indicate whether the affected node an will be reached before the failure is fixed. If a regression model is used, two determinations can be made. First, by comparing the predicted value with the average or maximum time to fix the resource, it can be determined whether the predicted time to reach the node is smaller than the average time to fix the resource. Second, it can be determined whether time allows for repairing the degradation or failure.

A process instance is predicted to be affected by a failure or degradation (i.e, at risk instance) when both prediction models (118 and 120) indicate that it will be affected with high confidence. High confidence includes a determination that with a high probability (e.g., a probability exceeding a predefined threshold) the process instance will execute the affected node, or that with high probability it will arrive to the affected node before the resource failure or degradation is repaired. A confidence value is computed for the combined prediction as a function of the confidence of the predictions from each prediction model. Determining which instances will likely be impacted by a resource failure provides an opportunity to proactively prevent or minimize the likely potential impact from a resource failure or degradation.

Different data mining techniques can be used to build the prediction models 118 and 120. For example, in one embodiment of the present invention, decision trees are used as a technique for the outcome prediction model 118. A decision tree includes a tool adapted to evaluate interactions among predictors and generate predictions relating to particular instances. For example, a decision tree in accordance with embodiments of the present invention includes a conjunction of conditions that typically occur to achieve a given situation. Decision trees can assist in determining performance patterns (e.g., instances beginning on Friday afternoon require more than 24 hours to complete).

A learned decision tree (i.e., a decision tree that has been learned from a population of instances or training set) predicts whether a given instance will execute a node an. Such predictions are classified as either execute or not execute depending respectively on whether the node an will be executed. Another learned decision tree predicts whether a node will be executed within a given time period. Such predictions are classified as either execute before threshold T or not executed before threshold T depending respectively on whether the node will be executed within a given time period. In one embodiment of the present invention, such a technique is used for the outcome model 118 and also for the interval prediction model 120. For example, when the output of prediction model 120 is whether the time to get to node an will be greater than a given value x, where x is some statistical value (e.g., average, maximum, or average plus one standard deviation of the repair time of a resource), a decision tree is utilized. In another embodiment, Naive Bayes is used as a classification technique to learn the classification models that will be applied to classify process instances. Further, in another embodiment of the present invention, regression is used for the interval prediction model 120. When the purpose of the interval prediction model 120 is to predict the time t that it will take to arrive to a given node an, the issue is treated with a regression technique (e.g., numeric prediction). In another embodiment it is treated as a time series issue where the sequence of historical values (i.e., time series) of the time t is used to generate a forecasting model.

Figure 3:
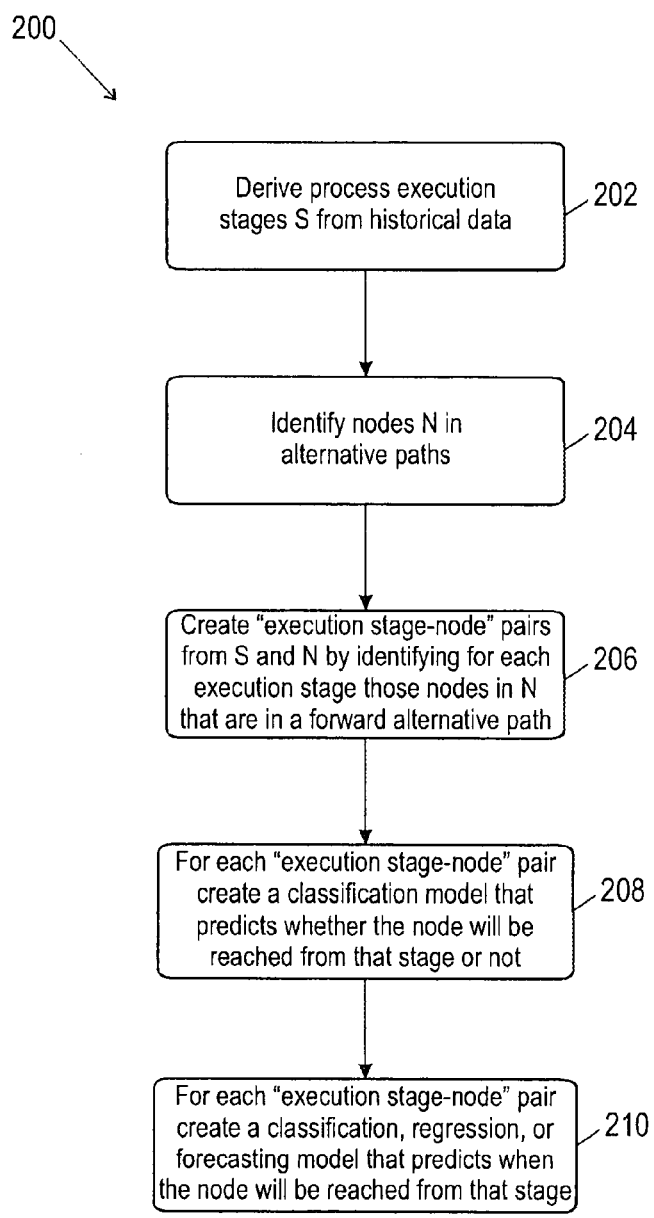
FIG. 3 is a flowchart of an initialization phase illustrating one embodiment of the present invention.

FIG. 3 is a flowchart of an initialization phase illustrating one embodiment of the present invention. The initialization phase flow chart is generally referred to as flowchart 200 and illustrates learning prediction models. Specifically, flowchart 200 relates to the generation of outcome prediction model 118 and interval prediction model 120 for each pair execution stage S and node N in a forward alternative path from S. The flowchart 200 begins with block 202, which represents deriving process execution stages S from historical data. Next, nodes N in alternative paths are identified in block 204. The nodes in N that are in a forward alternative path are identified for each execution stage to create execution stage-node pairs from S and N in block 206. For each execution stage-node pair, block 208 represents creating a classification model that predicts whether the node of the pair will be reached from the execution stage of the pair. Finally, for each execution stage and node pair, a prediction (i.e., classification, regression, or time series forecasting) model learned to predict when the node will be reached from the stage is created as illustrated by block 210.

Figure 4:
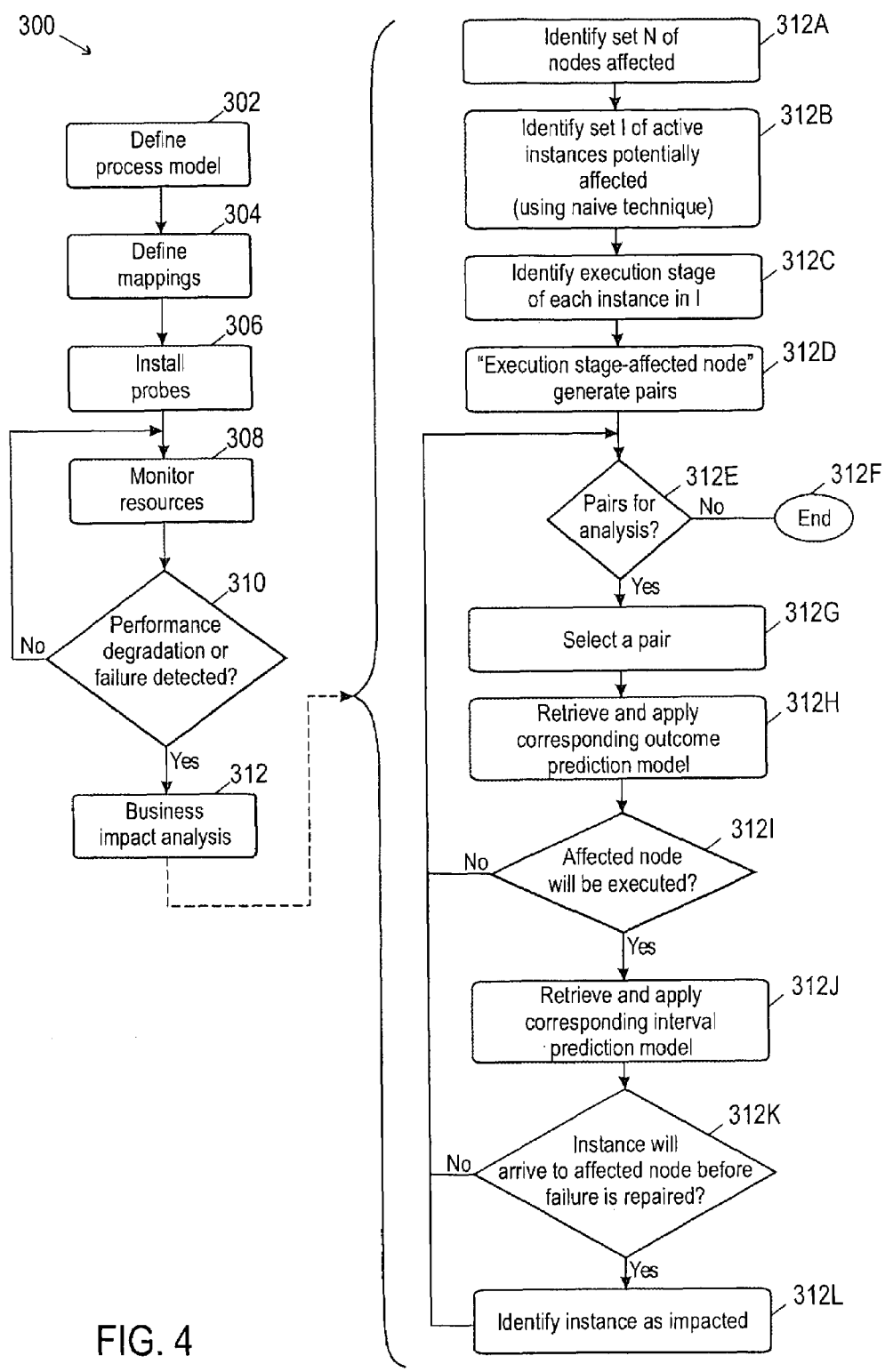
FIG. 4 is a flow diagram of an application phase that occurs when an event signals a failure or performance degradation in a resource illustrating one embodiment of the present invention.

FIG. 4 is a flow diagram of an application phase that occurs when an event signals a failure or performance degradation in a resource illustrating one embodiment of the present invention. The flow diagram is generally referred to by reference number 300. Specifically, flow diagram 300 illustrates retrieval of appropriate prediction models and application of the models to active instances to predict whether a failed or degraded resource will cause an impact on specific process instances.

The flow diagram 300 begins with defining a process model in block 302. For example, in one embodiment of the present invention, modeling tool 102 defines a plurality of such models for use in predicting impacts. Once a model is defined, mappings of resources (e.g., electronic and human resources) to different nodes of a process model are specified as illustrated by block 304. Next, probes are installed (block 306) and are utilized to monitor process related resources (block 308). For example, the resource monitoring tool 104 is utilized to install the probes 106 to monitor the status of certain process resources. If an installed probe detects resource performance degradation or failure (block 310), the flow diagram 300 proceeds to business impact analysis (block 312). Alternatively, resource monitoring continues at block 308.

The business impact analysis represented by block 312 includes various procedural acts, which are represented in the flow diagram 300 as components of block 312. In one embodiment of the present invention, the procedural acts are performed in the order illustrated. However, in other embodiments, certain procedural acts are performed in a different order. In the illustrated embodiment, the business impact analysis 312 first identifies a set N of affected nodes, as represented by block 312A. Identifying these affected nodes is facilitated by the previously defined process model or models along with the resource-node mappings. Block 312B represents identifying a set I of active instances that will potentially be affected. This identification of instances is achieved using an identification technique such as the previously discussed forward path technique. Further, the execution stage of each instance in I is then identified, as illustrated by block 312C. Once the nodes, active instances, and execution stages are identified, the business impact analysis 312 proceeds to generate a plurality of execution stage-affected node pairs, as illustrated by block 312D.

Block 312E determines whether any pairs remain for analysis. If no pairs remain for analysis, the process ends (block 312F). This prevents an infinite loop. If pairs remain for analysis, the process continues to block 312G. Block 312G represents selecting a pair from the plurality of pairs generated in block 312D. Block 312H represents retrieving and applying an outcome prediction model that corresponds to the selected pair. For example, a given pair corresponds to a given prediction model. Block 312I represents determining whether an affected node will be executed using the prediction model. If the outcome prediction model indicates that the node will not be executed, the business impact analysis 312 proceeds to select another pair in block 312G. However, if the outcome prediction model indicates that the node will be executed, the process proceeds to retrieve and apply an interval prediction model that corresponds to the selected pair, as represented by block 312J. Further, in block 312K, a determination is made as to whether an instance will arrive to an affected node prior to repairing the failure or degradation. If the interval prediction model indicates that the arrival will not occur before repair, another pair is selected in block 312G. However, if the interval prediction model indicates that arrival will occur before repair, both models (interval prediction model and outcome prediction model) provide indication of the likeness of the impact and the related instance is identified as being impacted (block 312L).

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for analyzing processes using a processor, comprising:
   identifying a node of a process that is potentially affected by an affected resource using information relating to a link between the node and the affected resource, the process having a related process instance that has an execution stage; and
   applying an interval prediction model corresponding to the execution stage of the process instance and the node, the interval prediction model determining a probability that the process instance will reach the node within an interval of time occurring before a designated occurrence and adjusting the process being analyzed based on the probability.

2. The method of claim 1, further comprising applying an outcome prediction model corresponding to the execution stage of the process instance and the node, the outcome prediction model determining a probability that the node will be executed by the process instance.

3. The method of claim 2, further comprising predicting that the process instance will be impacted if the outcome prediction model and the interval prediction model indicate that the process instance will execute the node before the resource is restored with a confidence level above a threshold value.

4. The method of claim 2, wherein applying the outcome prediction model includes applying a classification model.

5. The method of claim 1, wherein applying the interval prediction model includes applying a classification model to determine whether the process instance will reach the node within a defined period.

6. The method of claim 1, wherein applying the interval prediction model includes utilizing time series forecasting to determine whether the process instance will reach the node within a defined period.

7. The method of claim 1, further comprising installing an information technology resource monitoring system in a managed process to facilitate identification of the affected resource.

8. The method of claim 1, further comprising:
identifying the process instance as a likely impacted instance; and
adjusting the process instance to avoid the likely impact.

9. The method of claim 1, further comprising installing probes to monitor a status of a set of resources.

10. The method of claim 1, wherein the interval prediction model predicts a time interval for the process instance to reach the node.

11. The method of claim 10, further comprising comparing the time interval for the process instance to reach the node to a time interval statistic to restore the affected resource.

12. A method for analyzing processes using a processor, comprising:
identifying an at-risk instance using an established forward path through a node being affected by a status change of a system resource;
determining whether the at-risk instance will execute the node with a confidence level above a certain threshold value; and
determining and providing an indication to a user as to whether the at-risk instance will reach the node prior to returning the status to an original condition.

13. The method of claim 12, wherein determining whether the at-risk instance will execute the node comprises using an outcome prediction model.

14. The method of claim 12, wherein determining whether the at-risk instance will reach the node comprises using an interval prediction model.

15. The method of claim 14, wherein the interval prediction model includes time series forecasting to determine whether the at-risk instance will reach the node within a defined period.

16. The method of claim 14, wherein the interval prediction model predicts a time for the at-risk instances to reach the node.

17. The method of claim 16, further comprising comparing the time for the at-risk instance to reach the node to a restoration time interval statistic.

18. The method of claim 12, further comprising predicting that the at-risk instance will be impacted when an outcome prediction model used to determine whether the at-risk instance will execute the node and an interval prediction model used to determine whether the at-risk instance will reach the node indicate that the at-risk instance will be affected with a confidence level above a threshold value.

19. The method of claim 12, further comprising identifying a blocked instance that is being impacted by the status change of the system resource using an established relationship between the blocked instance and the system resource.

20. The method of claim 12, further comprising:
identifying the at-risk instance as an impacted instance; and
adjusting the process to accommodate the impacted instance.

21. A system for analyzing processes, comprising:
a processor-based identification module adapted to identify a node of a process that is potentially affected by an affected resource using information relating to a link between the node and the affected resource, the process having a related process instance that has an execution stage;
a processor-based outcome prediction model corresponding to the execution stage of the process instance and the node, the processor-based outcome prediction model adapted to determine a probability that the node will be executed by the process instance; and
a processor-based interval prediction model corresponding to the execution stage of the process instance and the node, the processor-based interval prediction model adapted to determine a probability that the process instance will reach the node within an interval of time occurring before a designated occurrence and provide an indication of the probability to a user.

22. The system of claim 21, wherein the processor-based interval prediction model is adapted to predict a time interval for the process instance to reach the node.

23. The system of claim 21, further comprising a processor-based comparison module adapted to compare the time interval for the process instance to reach the node to a time interval statistic to restore the affected resource.

24. The system of claim 21, further comprising a processor-based impact module adapted to develop a prediction that the process instance will be impacted when the processor-based outcome prediction model and the processor-based interval prediction model indicate that the process instance will be affected with a confidence level above a threshold value.

25. The system of claim 21, wherein the processor-based interval prediction model includes a classification model.

26. Application instructions that when executed by a computer comprising a processor, comprise:
instructions adapted to identify a node of a process that is potentially affected by an affected resource using information relating to a link between the node and the affected resource, the process having a related process instance that has an execution stage;
instructions adapted to utilize an outcome prediction model corresponding to the execution stage of the process instance and the node, the outcome prediction model adapted to determine a probability that the node will be executed by the process instance; and
instructions adapted to utilize an interval prediction model corresponding to the execution stage of the process instance and the node, the interval prediction model adapted to determine a probability that the process instance will reach the node in an interval of time occurring before a designated occurrence.

27. The application instructions of claim 26, further comprising instructions adapted to compare the time interval for the process instance to reach the node to a time interval statistic to restore the affected resource.

28. The application instructions of claim 26, further comprising instructions adapted to develop a prediction that the process instance will be impacted when the outcome prediction model and the interval prediction model indicate that the process instance will be affected with a confidence level above a threshold value.

29. A system for analyzing processes, comprising:
processor-based means for identifying a node of a process that is potentially affected by an affected resource using information relating to a link between the node and the affected resource, the process having a related process instance that has an execution stage;
processor-based means for applying an outcome prediction model corresponding to the execution stage of the process instance and the node, the outcome prediction model determining a probability that the node will be executed by the process instance; and processor-based means for applying an interval prediction model corresponding to the execution stage of the process instance and the node, the interval prediction model determining a probability that the process instance will reach the node before a designated occurrence.

30. A method for analyzing processes, comprising:

installing probes to monitor a status of a set of resources;

identifying a node of a process that is potentially affected by an affected resource in the set of resources using information relating to a link between the node and the affected resource, the process having a related process instance that has an execution stage;

applying an outcome prediction model corresponding to the execution stage of the process instance and the node, the outcome prediction model determining a probability that the node will be executed by the process instance; and applying an interval prediction model corresponding to the execution stage of the process instance and the node, the interval prediction model predicting a time interval for the process instance to reach the node and determining a probability that the process instance will reach the node before a designated occurrence;

comparing the time interval for the process instance to reach the node to a time interval statistic to restore the affected resource;

predicting that the process instance will be impacted when the outcome prediction model and the interval prediction model indicate that the process instance will be affected with a confidence level above a threshold value.

* * * * *